(12) United States Patent
Toriumi et al.

(10) Patent No.: US 7,338,383 B2
(45) Date of Patent: Mar. 4, 2008

(54) CONSTANT VELOCITY JOINT BOOT

(75) Inventors: Mayuki Toriumi, Aichi-ken (JP);
Takeo Yamamoto, Nissin (JP);
Hiroyuki Takigami, Toyota (JP);
Takanori Hibino, Toyota (JP)

(73) Assignees: Toyoda Gosei Co., Ltd., Aichi-ken (JP); Toyota Jidosha Kabushiki Kaisha, Toyota-shi (JP)

( * ) Notice: Subject to any disclaimer, the term of this patent is extended or adjusted under 35 U.S.C. 154(b) by 292 days.

(21) Appl. No.: 11/065,425

(22) Filed: Feb. 25, 2005

(65) Prior Publication Data

US 2005/0192107 A1    Sep. 1, 2005

(30) Foreign Application Priority Data

Feb. 27, 2004   (JP) .......................... P2004-054619

(51) Int. Cl.
*F16D 3/84*   (2006.01)
(52) U.S. Cl. ....................... 464/175; 464/905
(58) Field of Classification Search .............. 464/173, 464/175, 905; 277/634–637
See application file for complete search history.

(56) References Cited

U.S. PATENT DOCUMENTS

| | | | | |
|---|---|---|---|---|
| 1,922,431 A | * | 8/1933 | Geyer | ......................... 464/175 |
| 4,795,404 A | * | 1/1989 | Sutton et al. | ................ 464/905 |
| 5,529,538 A | * | 6/1996 | Schulz et al. | ........... 464/175 X |
| 6,695,706 B2 | | 2/2004 | Furuta | |

FOREIGN PATENT DOCUMENTS

| | | |
|---|---|---|
| JP | UM-A-02-071122 | 5/1990 |
| JP | UM-A-02-087131 | 7/1990 |
| JP | A-2003-113858 | 4/2003 |

\* cited by examiner

*Primary Examiner*—Greg Binda
(74) *Attorney, Agent, or Firm*—Posz Law Group, PLC

(57) ABSTRACT

Positioning projections for engaging recesses in an outer peripheral surface of a mating member project from an inner peripheral surface of a grommet, and the position of a minimum inside diameter portion of each positioning projection after being fitted to the mating member is offset from interference of a jointing member. In a case where the positioning projections are formed in front of a sealing projection, a larger cylindrical portion is absent around their outer peripheries. Therefore, the enlargement of the diameter of the grommet during fitting to the mating member is not restricted, resistance during fitting is alleviated, and the positioning projections are engaged in the recesses with large elastic reaction force. Hence, a click feel is excellent.

10 Claims, 2 Drawing Sheets

CONSTANT VELOCITY JOINT BOOT

BACKGROUND OF THE INVENTION

1. Field of the Invention

The present invention relates to a boot for covering a constant velocity joint which is indispensable as a joint for a drive shaft of a front-wheel-drive vehicle.

2. Description of the Related Art

Conventionally, a joint portion of a constant velocity joint is covered with a bellows-shaped boot with grease sealed therein, to maintain large-angle and smooth rotation by preventing the entry of water and dust. This constant velocity joint boot is comprised of a larger cylindrical portion having a large diameter and retained by a joint outer race or the like, a smaller cylindrical portion having a smaller diameter than the larger cylindrical portion and retained by a shaft, and a conical bellows portion for integrally connecting the smaller cylindrical portion and the larger cylindrical portion. During use, the bellows portion undergoes deformation in correspondence with a change in an angle (joint angle) formed by the shaft and the joint outer race or the like. Therefore, even if the angle becomes large, the joint portion can be reliably sealed by the boot.

This constant velocity joint boot was formerly formed of rubber in many cases. However, since there is a limit to durability in the case of rubber, a thermoplastic elastomer excelling weather resistance and fatigue resistance has come to be used in recent years. Meanwhile, in the case of the constant velocity joint boot, there is a need to impart a sealing function for reliably preventing the entry of water and dust into the joint. However, if the thermoplastic elastomer is used as the material, since there are many cases where the larger cylindrical portion is fitted in the form of different-shape fitting or non-circle fitting, and since the resiliency of the thermoplastic elastomer is high and its follow-up characteristic is not as good as rubber, there has been a problem in that it is difficult to ensure sealability. In addition, blow molding is convenient as a method of molding the constant velocity joint boot. Nevertheless, the surface of a mating member is generally noncircular, so that the boot needs to be provided with a shape corresponding thereto. However, in the case where such a boot is manufactured with blow molding, it is difficult to form the shape of the inner peripheral surface of the larger cylindrical portion such that its sealability with respect to the mating member becomes high. In this aspect as well, it is difficult to ensure sealability.

Accordingly, JP-UM-A-02-087131 discloses a constant velocity joint boot in which the boot body is formed of a polyester-based thermoplastic elastomer, and a soft rubber-made annular grommet is inserted in its larger cylindrical portion. According to this constant velocity joint boot, even a grommet which has thick-walled portions and thin-walled portions and whose inner peripheral surface is noncircular can be manufactured with high accuracy by injection molding or the like. Therefore, the boot body may not necessarily have very high geometrical accuracy and can be manufactured by blow molding. Further, a tightening force based on a clamp is transmitted to the grommet through the larger cylindrical portion, and the grommet undergoes elastic deformation, thereby exhibiting the sealing function. Namely, the boot body is capable of ensuring durability, while the grommet is capable of ensuring sealability with respect to the mating member. In addition, since the boot body having a large shape as compared to the grommet can be manufactured by blow molding, man-hour can be reduced and the cost can be lowered.

The constant velocity joint boot thus made up of the boot body and the grommet is fitted to the mating member in a state in which the grommet is inserted in the larger cylindrical portion, and is subsequently tightened by a clamp from the outer peripheral side of the larger cylindrical portion. Accordingly, during the fitting to the mating member, the positioning of insertion becomes necessary. For this reason, conventionally, a recess is formed in an outer peripheral surface of the mating member, while a positioning projection is formed on an inner peripheral surface of the grommet, and positioning is effected by causing the positioning projection to engage the recess.

However, there has been a problem in that although the grommet is soft, since the hard larger cylindrical portion is present on its outer periphery, when the positioning projection is brought into sliding contact with the outer peripheral surface of the mating member during fitting to the mating member, the deformation in the diameter enlarging direction of the grommet is restricted, which constitutes resistance in fitting, so that the operational efficiency in fitting is poor. In addition, there are cases where an axial offset occurs between the larger cylindrical portion and the grommet. Further, there has been a drawback in that even if the positioning projection is engaged with the recess of the mating member during fitting, since the amount of deformation of the grommet is small, it is impossible to obtain a click feel of fitting, and it is impossible to confirm whether or not the positioning has been effected.

In addition, an annular sealing projection is formed on the inner periphery of the grommet, and its position in axial direction is located in the range of interference of the clamp. In addition, there are many cases where a sealing projection is also formed at a distal end of the positioning projection. However, during fitting to the mating member, since the sealing projections come into sliding contact with the mating member, wear and damage can occur in the sealing projections, in which case trouble occurs in sealability.

Accordingly, JP-UM-A-02-071122 discloses a constant velocity joint boot in which a slit extending in the axial direction from an end face of the larger cylindrical portion is formed, and a positioning protrusion is formed by avoiding that slit. If such an arrangement is provided, the enlargement of the diameter of the larger cylindrical portion is facilitated by the slit, and resistance during fitting can be reduced, but it is difficult to obtain a click feel at the time the positioning projection engages the recess. In the constant velocity joint boot made up of the boot body and the grommet, if consideration is given to the adoption of this structure, the formation of the slit in the grommet or the larger cylindrical portion is not recommendable from the viewpoint of sealability in addition to the problem of the click feel, and there is also the problem of increased man-hour.

SUMMARY OF THE INVENTION

The present invention has been devised in view of the above-described circumstances, and its object is to provide a constant velocity joint boot which is capable of maintaining sealability to a high degree, of reducing resistance during fitting to the mating member, and of obtaining a click feel upon completion of fitting.

The constant velocity joint boot of the invention for overcoming the above-described problems is characterized by comprising: a boot body including a smaller cylindrical portion retained by a shaft, a larger cylindrical portion disposed coaxially with the smaller cylindrical portion in spaced-apart relation thereto and having a larger diameter than the smaller cylindrical portion; and a conical bellows portion for integrally connecting the smaller cylindrical portion and the larger cylindrical portion; and an annular grommet which is formed of a softer material than the larger cylindrical portion and whose inner peripheral cross section is noncircular, the annular grommet having a sealing projection on an inner peripheral surface thereof and being fitted to a mating member after being inserted into the larger cylindrical portion, the larger cylindrical portion and the grommet being tightened on the mating member as a jointing member by reducing diameters from an outer peripheral surface of the larger cylindrical portion, wherein a positioning projection engageable in a recess in an outer peripheral surface of the mating member projects from the inner peripheral surface of the grommet, and a position of a minimum inside diameter portion of the positioning projection after the mating member is fitted to the grommet inserted in the larger cylindrical portion is offset in axial direction from interference of the jointing member.

The larger cylindrical portion is preferably absent around an outer periphery of the positioning projection. In addition, a protrusion against which an end face of the larger cylindrical portion abuts is preferably provided on an outer peripheral surface of the grommet.

According to the constant velocity joint boot of the invention, since the axial position of a minimum inside diameter portion of the positioning projection is offset from the interference of the jointing member, the positioning projection does not affect sealability. In addition, in a case where the positioning projection is formed in front of the sealing projection (on the opening side of the larger cylindrical portion), it is possible to provide an arrangement in which the larger cylindrical portion is absent around its outer periphery. Therefore, the enlargement of the diameter of the grommet during fitting to the mating member is not restricted, and resistance during fitting is alleviated. Furthermore, when the positioning projection reaches the position of the recess of the mating member, the portion subjected to enlargement in diameter is restored to its original shape by a large elastic reaction force. Therefore, it is possible to obtain a favorable click feel and effect positioning reliably.

Meanwhile, in a case where the positioning projection is formed in the rear of the sealing projection (on the bellows portion side), since the amount of movement of the positioning projection during fitting is small, the resistance during fitting is alleviated. Further, if the recess of the mating member is formed in the shape of a notch which is open in a distal end of the mating member, even if the grommet is not diametrically enlarged to a large degree, fitting can be effected. Moreover, since the positioning projection abuts against an end of the notch, the resistance increases sharply, so that the positioning of fitting can be effected reliably.

In addition, a protrusion against which the end face of the larger cylindrical portion abuts is provided on the outer peripheral surface of the grommet, it is possible to prevent an offset between the larger cylindrical portion and the grommet during fitting. Additionally, it is possible to obtain a more click feel as the load for pushing back the protrusion by the end face is released by the fitting of the positioning projection into the mating groove.

The boot body is made up of a smaller cylindrical portion retained by a shaft, a larger cylindrical portion disposed coaxially with the smaller cylindrical portion in spaced-apart relation thereto and having a larger diameter than the smaller cylindrical portion, and a conical bellows portion for integrally connecting the smaller cylindrical portion and the larger cylindrical portion. The boot body is basically similar to a conventional one. At least, a construction is preferably provided such that a clamp groove for engagement with a jointing member such as a clamp is formed in the outer peripheral surface of the larger cylindrical portion, and a protrusion is formed on its inner peripheral surface, such that as the protrusion is engaged with the outer peripheral surface of the grommet, sealability between the boot body and the grommet is ensured.

This boot is preferably formed of a thermoplastic elastomer such as a polyester-based or polyolefin-based one. It is thereby possible to provide a high-durability boot. In addition, although the molding method is not particularly limited, the boot body is preferably formed by blow molding in view of the cost. In the boot body formed by blow molding, it is difficult to control the shape of the inner peripheral surface of the larger cylindrical portion, and the dimensional accuracy of the wall thickness is low, but these do not constitute problems in the constant velocity joint boot using a grommet.

The grommet is an annular one whose inner peripheral cross section is noncircular, which has a sealing projection on an inner peripheral surface thereof, and which has thick-walled portions and thin-walled portions corresponding to the shape of the outer peripheral surface of the mating member to be fitted to. A positioning projection engageable in a recess in an outer peripheral surface of the mating member projects from the inner peripheral surface of the grommet. The position of the positioning projection suffices if the position of a minimum inside diameter portion of the positioning projection after being fitted to the mating member is offset in axial direction from the interference of the jointing member. The number of the positioning projections may be one or more. The sealing projection is formed on that portion of the inner peripheral surface of the jointing member which corresponds to its interference. As this sealing projection, one sealing projection may be used, but it is preferable to use two or more. In addition, a protrusion against which the end face of the larger cylindrical portion abuts is preferably provided on the outer peripheral surface of the grommet. By so doing, it is possible to prevent an axial offset between the larger cylindrical portion and the grommet during fitting to the mating member.

The positioning protrusion may be formed around the entire inner periphery of the grommet, or may be formed only on the thick-walled portions or the thin-walled portions. Since there are many cases where sealability is ensured by the thick-walled portions having sufficient elasticity, it is preferable to form the positioning projections on the thin-walled portions so as to distribute the functions between the thin-walled portions and the thick-walled portions. If the positioning projections are formed on the thin-walled portions, the processing of the recesses of the mating member is facilitated. In addition, a sealing projection may also be formed at a distal end of the positioning projection. The positioning projection is preferably provided with a cross-sectional shape having an inclined surface which is smoothly inclined on its surface oriented in the fitting direction. Resistance during fitting can thereby be reduced. In addition, if the surface of the positioning projection away from the inclined surface is formed as a surface which rises up rather acutely from the inner peripheral surface of the grommet, it is possible to reliably prevent the grommet from coming off the mating member.

As the material of the grommet, it suffices if it is softer than the boot body, and it is possible to use an expensive polyolefin-based thermoplastic elastomer (TPO) or such as rubber. In addition, the molding method is not particularly limited; the grommet may be formed by compression molding, injection molding, or the like. The positioning projections and the sealing projections are formed integrally with the grommet.

As the mating member, the joint outer race is typically used, and corresponding recesses are formed at positions on its outer peripheral surface where the positioning projections are engaged.

DETAILED DESCRIPTION OF THE PREFERRED EMBODIMENTS

Hereafter, a detailed description will be given of the embodiments of the invention with reference to the accompanying drawings.

First Embodiment

Figure 1:
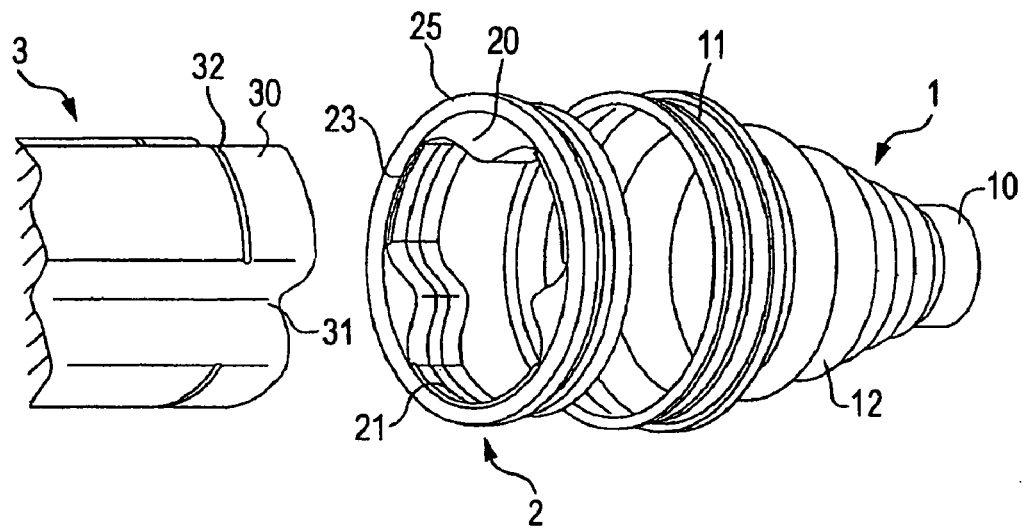
FIG. 1 is an exploded perspective view illustrating a constant velocity joint boot in accordance with an embodiment of the invention together with a mating member.
Figure 2:
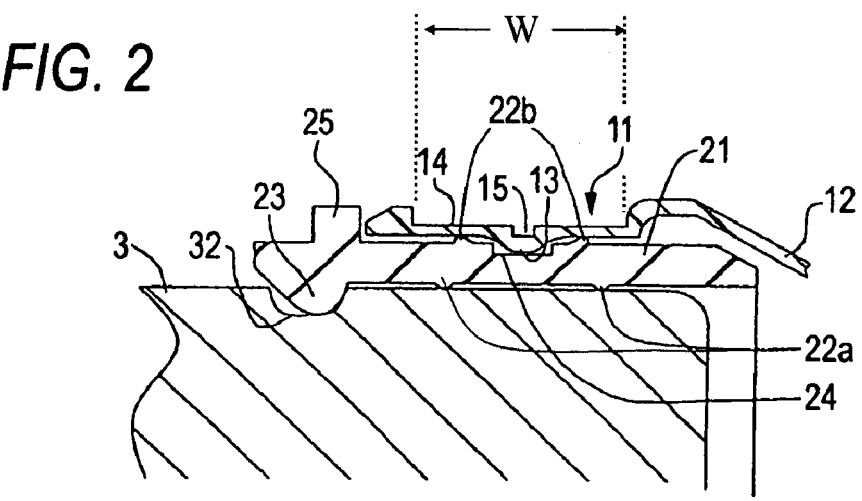
FIG. 2 is an enlarged cross-sectional view of essential portions illustrating the constant velocity joint boot in accordance with the embodiment of the invention in a state of being fitted to the mating member.

FIG. 1 shows an exploded perspective view of a constant velocity joint boot in accordance with a first embodiment of the invention. FIG. 2 shows an enlarged cross-sectional view of essential portions in a state in which the constant velocity joint boot is fitted to a mating member. This constant velocity joint boot is comprised of a boot body 1 and an annular grommet 2 inserted in a larger cylindrical portion 11 of the boot body 1. The boot body 1 is formed of a relatively hard thermoplastic elastomer by blow molding, and the grommet 2 is formed of rubber or a relatively soft thermoplastic elastomer by injection molding.

The boot body 1 is made up of a smaller cylindrical portion 10, a larger cylindrical portion 11 having a larger diameter than the smaller cylindrical portion 10, and a conical bellows portion 12 for integrally connecting the smaller cylindrical portion 10 and the larger cylindrical portion 11. An annular protrusion 13 is circumferentially formed on an inner peripheral surface of the larger cylindrical portion 11. The surface of the protrusion 13 is formed with a circular arc-shaped cross section. A wide and substantially flat clamp groove 14 having a width (W) is formed on an outer peripheral surface of the larger cylindrical portion 11, and an annular U-groove 15 is formed on the surface of the clamp groove 14 at a position corresponding to a reverse side of the protrusion 13. By virtue of the presence of this U-groove 15, the formation of the protrusion 13 by blow molding is made possible. The bellows portion 12 continues to an end of the clamp groove 14 of the larger cylindrical portion 11, and an end of the bellows portion 12 forms an end of the one end of the clamp groove 14.

The grommet 2 is inserted in the larger cylindrical portion 11 and is, in that state, fitted over a joint outer race 3 which is a mating member. This grommet 2 has a completely round outer periphery, but its inner peripheral surface is formed in the shape of a non-circle corresponding to an outer peripheral surface of the joint outer race 3, thick-walled portions 20 and thin-walled portions 21 being formed alternately in the circumferential portion.

Two annular sealing projections 22a, which are brought into resilient contact with the joint outer race 3, are formed on the inner peripheral surface of the grommet 2 over the entire circumference in parallel with each other. In addition, three positioning projections 23 extending in the circumferential direction are formed in the vicinities of one end faces of the thin-walled portions 21 in such a manner as to be spaced apart from each other. Two annular sealing projections 22b, which are brought into resilient contact with the larger cylindrical portion 11, are formed on the outer peripheral surface of the grommet 2 over the entire circumference in parallel with each other. An annular groove 24, with which the protrusion 13 is engaged, is formed on the outer peripheral surface of the grommet 2 between the sealing projections 22b. An annular protrusion 25 is formed on the outer peripheral surface of the grommet 2 in the vicinity of its end face where the positioning projections 23 are located.

On the joint outer race 3, large-diameter portions 30 having a large diameter and small-diameter portions 31 having a small diameter are formed alternately in the circumferential direction, and a circumferentially extending recess 32 is formed on the surface of each large-diameter portion 30.

In the constant velocity joint boot of this embodiment constructed as described above, the grommet 2 is inserted into the larger cylindrical portion 11 from its end portion on the side away from the end portion where the positioning projections 23 are formed, and the positioning of the insertion is effected as a distal end face of the larger cylindrical portion 11 abuts against the protrusion 25. At this time, the protrusion 13 is engaged with the annular groove 24, the two sealing projections 22a are both located within the width of the clamp groove 14, and the positioning projections 23 are located outwardly of the end face of the larger cylindrical portion 11.

Figure 3:
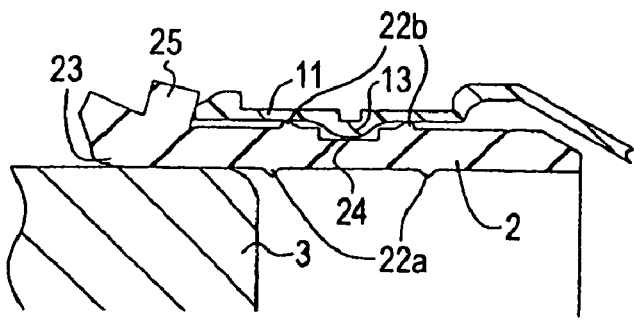
FIG. 3 is an enlarged cross-sectional view of the essential portions illustrating the constant velocity joint boot in accordance with the embodiment of the invention in the midst of being fitted to the mating member.

In this state, the joint outer race 3 is fitted into the grommet 2. Since a minimum inside diameter of the positioning projections 23 is smaller than a maximum outside diameter of the joint outer race 3, a diametrically enlarging force acts on the grommet 2. Since the positioning projections 23 are located outwardly of the end face of the larger cylindrical portion 11, the end portion of the grommet 2 at this time is easily elastically deformed, as shown in FIG. 3, thereby alleviating fitting resistance by the positioning projections 23.

When the fitting further progresses and the positioning projections 23 come to be located at the positions of the recesses 32, the positioning projections 23 suddenly enter the recesses 32 owing to their built-up elastic reaction force. At that instant, the fitting resistance suddenly declines. Accordingly, it is possible to perceive the completion of the positioning with a click feel, making it possible to prevent faulty fitting. In addition, as the distal end face of the larger cylindrical portion 11 abuts against the protrusion 25, an axial offset between the larger cylindrical portion 11 and the grommet 2 is prevented.

In addition, in the fitted state, the positioning projections 23 are located away from the clamp groove 14, so that a tightening force based on a clamp (not shown) is transmitted only to the two annular sealing projections 22a, thereby demonstrating high sealability.

Further, a sealing between the larger cylindrical portion 11 and the grommet 2 is provided by the sealing projections 22b. Between the large cylindrical portion 11 and the grommet 2, the tightening force based on the clamp is transmitted to the pair of annular sealing projections 22b and the protrusion 13, so that high sealability is obtained between the larger cylindrical portion 11 and the grommet 2.

Second Embodiment

Figure 4:
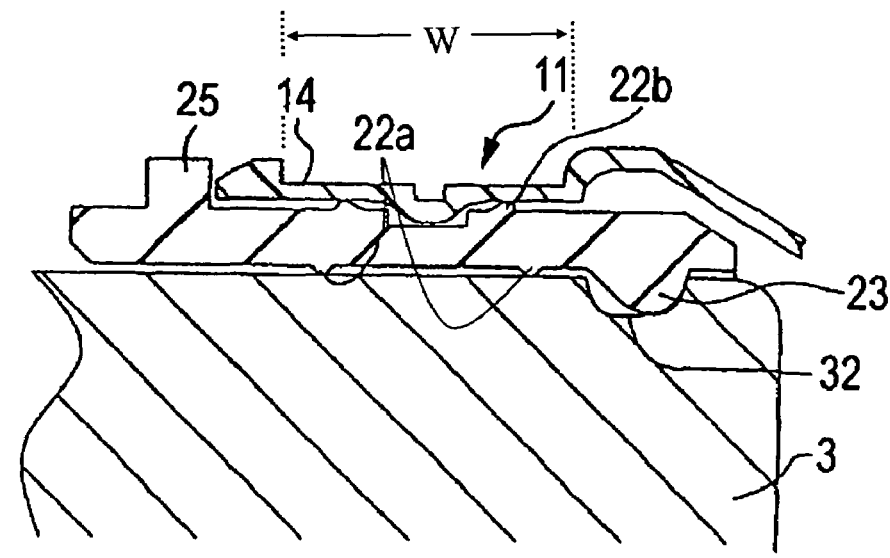
FIG. 4 is an enlarged cross-sectional view of essential portions illustrating the constant velocity joint boot in accordance with a second embodiment of the invention in the state of being fitted to the mating member.

FIG. 4 shows a state in which the constant velocity joint boot in accordance with a second embodiment is fitted to the joint outer race 3. This embodiment has a construction similar to that of the first embodiment except that the positioning projections 23 are formed in the vicinity of an opposite end of the grommet 2, and that the recesses 32 are formed in the vicinity of a distal end of the joint outer race 3.

In the case where the constant velocity joint boot of this embodiment is fitted to the joint outer race 3, the positioning projections 23 do not abut against the joint outer race 3 in an initial period of fitting, and abut against it for the first time in a final period of fitting. Accordingly, the period during which the resistance due to the positioning projections 23 appears during fitting is short, so that fitting can be effected relatively easily.

In the fitted state, the positioning projections 23 are located away from the clamp groove 14, so that the tightening force based on the clamp is transmitted only to the two annular sealing projections 22a, thereby demonstrating high sealability.

Third Embodiment

Figure 5:
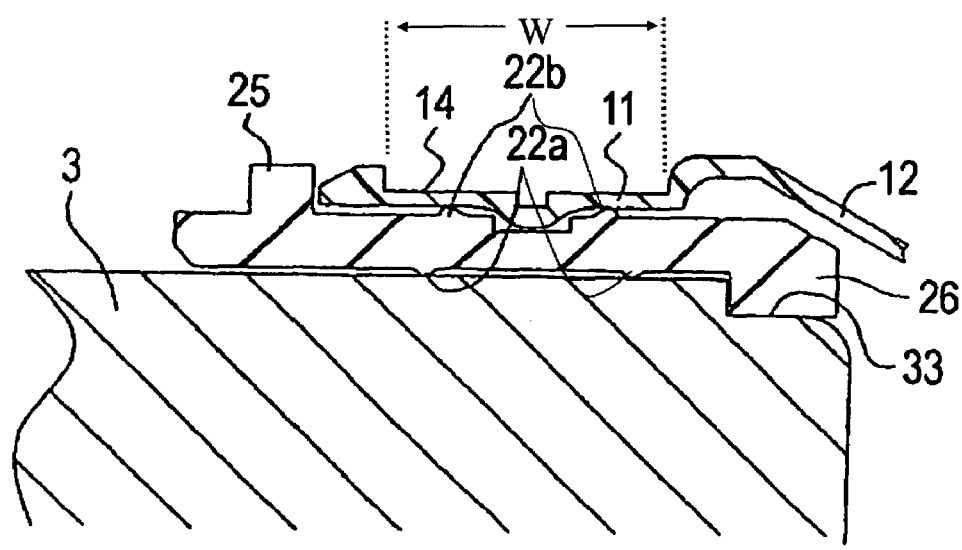
FIG. 5 is an enlarged cross-sectional view of essential portions illustrating the constant velocity joint boot in accordance with a third embodiment of the invention in the state of being fitted to the mating member.

FIG. 5 shows a state in which the constant velocity joint boot in accordance with a second embodiment is fitted to the joint outer race 3. This embodiment has a construction similar to that of the first embodiment except that positioning projections 26 are formed at the end of the grommet 2 on the side of the bellows portion 12, and that notched recesses 33 are formed at the distal end of the joint outer race 3.

In the case where the constant velocity joint boot of this embodiment is fitted to the joint outer race 3, the positioning projections 26 are only guided into the notched recesses 33 during a final period of fitting, and the resistance due to the positioning projections 26 does not appear from the initial period of fitting until the completion of fitting, so that fitting can be effected quite easily. In addition, as the positioning projections 26 abut against ends of the recesses 33, the insertion is made difficult further than that, so that positioning can be effected reliably.

In the fitted state, the positioning projections 26 are located away from the clamp groove 14, so that the tightening force based on the clamp is transmitted only to the two annular sealing projections 22a, thereby demonstrating high sealability.

What is claimed is:

1. A constant velocity joint boot, comprising:
    a boot body including
        a smaller cylindrical portion attachable to a shaft,
        a larger cylindrical portion disposed coaxially with and at a distance from the smaller cylindrical portion, being larger than the smaller cylindrical portion in diameter, and having a clamp groove on an outer peripheral surface, and
        a conical bellows portion connecting the smaller cylindrical portion and the larger cylindrical portion; and
    an annular grommet formed of a softer material than the larger cylindrical portion having a non-circular inner peripheral shape, the annular grommet including at least one sealing projection to be engaged with a mating member on an inner peripheral surface thereof, wherein
    the larger cylindrical portion and the grommet are arranged on the mating member,
    at least one positioning projection projects from the inner peripheral surface of the grommet and is engageable in a recess on an outer peripheral surface of the mating member, and
    the positioning projection is formed at an end of the grommet from which the mating member is inserted and has a minimum inside diameter portion located away from the clamp groove in the axial direction.

2. The constant velocity joint boot according to claim 1, wherein a protrusion against which an end face of the larger cylindrical portion abuts is provided on an outer peripheral surface of the grommet.

3. The constant velocity joint boot according to claim 1, wherein a protrusion is formed around an entire circumference of an inner peripheral surface of the larger cylindrical portion.

4. The constant velocity joint boot according to claim 3, wherein the positioning projection is formed on a surface of the thin-walled portion.

5. The constant velocity joint boot according to claim 1, wherein at least one thick-walled portion and at least one thin-walled portion are formed on the inner peripheral surface of the grommet.

6. The constant velocity joint boot according to claim 5, wherein the thick-walled portion and the thin-walled portion are disposed so as to form the non-circular peripheral shape, which corresponds to an outer peripheral surface of the mating member.

7. The constant velocity joint boot according to claim 1, wherein the sealing projection is provided around an entire circumference of an inner peripheral surface of the grommet.

8. The constant velocity joint boot according to claim 7, wherein the positioning projection extends in a circumferential direction of the grommet.

9. The constant velocity joint boot according to claim 1, wherein at least one sealing projection is provided around an entire circumference of an outer peripheral surface of the grommet.

10. A constant velocity joint boot, comprising:
    a boot body including a first cylindrical portion, a second cylindrical portion larger than, and disposed coaxially with, the first cylindrical portion and defining a clamp groove having a width (W) on an outer peripheral surface thereof, and a conical bellows portion connecting the first cylindrical portion and the second cylindrical portion; and
    an annular grommet mateable with the second cylindrical portion and having an inner peripheral surface with thick walled portions projecting radially inwardly therefrom, the grommet being softer than the second cylindrical portion of the boot body, and having sealing projections and mating member recess positioning projections located on the inner peripheral surface between adjacent ones of the thick walled portions, wherein the positioning projections protrude inwardly moreso than the sealing projections and are axially disposed outside of the clamp groove width (W), and the sealing projections are axially disposed inside of the clamp groove width (W), and the positioning projections are positioned at a mating member insertion end of the grommet.

\* \* \* \* \*